(12) United States Patent
Thomas et al.

(10) Patent No.: US 10,169,254 B2
(45) Date of Patent: Jan. 1, 2019

(54) INCREASING VIRTUAL-MEMORY EFFICIENCIES

(71) Applicant: Intel Corporation, Santa Clara, CA (US)

(72) Inventors: Ramesh Thomas, Saratoga, CA (US); Kuo-Lang Tseng, Cupertino, CA (US); Ravi L. Sahita, Portland, OR (US); David M. Durham, Beaverton, OR (US); Madhukar Tallam, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 7 days.

(21) Appl. No.: 15/667,540

(22) Filed: Aug. 2, 2017

(65) Prior Publication Data

US 2017/0344494 A1    Nov. 30, 2017

Related U.S. Application Data

(60) Division of application No. 14/709,369, filed on May 11, 2015, which is a continuation of application No.
(Continued)

(30) Foreign Application Priority Data

Jan. 4, 2012    (WO) ................ PCT/US2012/020231

(51) Int. Cl.
*G06F 12/00* (2006.01)
*G06F 12/14* (2006.01)
(Continued)

(52) U.S. Cl.
CPC ...... *G06F 12/1458* (2013.01); *G06F 9/45533* (2013.01); *G06F 9/468* (2013.01);
(Continued)

(58) Field of Classification Search
CPC .... G06F 12/1109; G06F 12/145; G06F 12/08; G06F 12/1458; G06F 12/1483
See application file for complete search history.

(56) References Cited

U.S. PATENT DOCUMENTS

| | | | | |
|---|---|---|---|---|
| 6,105,113 A | * | 8/2000 | Schimmel | ........... G06F 12/1027 711/144 |
| 7,721,064 B1 | | 5/2010 | Lam et al. | |

(Continued)

FOREIGN PATENT DOCUMENTS

| | | |
|---|---|---|
| TW | 200417216 A1 | 9/2004 |
| WO | WO0068779 A2 | 11/2000 |
| WO | WO 2011/152816 A1 | 12/2011 |

OTHER PUBLICATIONS

International Search Report and Written Opinion dated Sep. 27, 2012 for PCT Application No. PCT/US2012/020231, 11 pages.
(Continued)

*Primary Examiner* — David Yi
*Assistant Examiner* — Alan Otto
(74) *Attorney, Agent, or Firm* — Schwabe, Williamson & Wyatt, P.C.

(57) ABSTRACT

Embodiments of techniques and systems for increasing efficiencies in computing systems using virtual memory are described. In embodiments, instructions which are located in two memory pages in a virtual memory system, such that one of the pages does not permit execution of the instructions located therein, are identified and then executed under temporary permissions that permit execution of the identified instructions. In various embodiments, the temporary permissions may come from modified virtual memory page tables, temporary virtual memory page tables which allow for execution, and/or emulators which have root access. In embodiments, per-core virtual memory page tables may be provided to allow two cores of a computer processor to
(Continued)

operate in accordance with different memory access permissions. In embodiments, a physical page permission table may be utilized to provide for maintenance and tracking of per-physical-page memory access permissions. Other embodiments may be described and claimed.

9 Claims, 10 Drawing Sheets

Related U.S. Application Data

13/734,834, filed on Jan. 4, 2013, now Pat. No. 9,141,559.

(51) Int. Cl.
*G06F 12/1009* (2016.01)
*G06F 9/455* (2018.01)
*G06F 11/14* (2006.01)
*G06F 11/20* (2006.01)
*G06F 9/46* (2006.01)
*G06F 12/08* (2016.01)

(52) U.S. Cl.
CPC ...... *G06F 11/1484* (2013.01); *G06F 11/2056* (2013.01); *G06F 12/1009* (2013.01); *G06F 12/145* (2013.01); *G06F 12/1425* (2013.01); *G06F 12/08* (2013.01); *G06F 12/1483* (2013.01); *G06F 2009/45583* (2013.01); *G06F 2009/45587* (2013.01); *G06F 2201/815* (2013.01); *G06F 2201/84* (2013.01); *G06F 2212/1052* (2013.01); *G06F 2212/657* (2013.01)

(56) References Cited

U.S. PATENT DOCUMENTS

| | | | |
|---|---|---|---|
| 7,814,287 B2* | 10/2010 | Pratt | G06F 12/1009 711/163 |
| 2002/0082823 A1 | 6/2002 | Traut | |
| 2004/0153672 A1 | 8/2004 | Watt et al. | |
| 2006/0200863 A1 | 9/2006 | Ray et al. | |
| 2006/0259818 A1 | 11/2006 | Howell et al. | |
| 2007/0028067 A1 | 2/2007 | Hinrichs et al. | |
| 2007/0124434 A1* | 5/2007 | Smith | H04L 63/10 709/220 |
| 2008/0235534 A1 | 9/2008 | Schunter et al. | |
| 2009/0049229 A1 | 2/2009 | Honda et al. | |
| 2009/0172353 A1 | 7/2009 | Su et al. | |
| 2009/0222816 A1 | 9/2009 | Mansell et al. | |
| 2010/0049960 A1 | 2/2010 | Okamoto et al. | |
| 2010/0333090 A1 | 12/2010 | Wright et al. | |
| 2011/0082962 A1 | 4/2011 | Horovitz et al. | |
| 2011/0087822 A1 | 4/2011 | Bennett et al. | |
| 2011/0161619 A1 | 6/2011 | Kaminski et al. | |
| 2012/0151184 A1* | 6/2012 | Wilkerson | G06F 8/43 712/36 |
| 2013/0104234 A1* | 4/2013 | Northup | G06F 21/52 726/24 |
| 2013/0191611 A1 | 7/2013 | Liu et al. | |
| 2014/0040593 A1 | 2/2014 | Sharp et al. | |

OTHER PUBLICATIONS

International Search Report and Written Opinion dated Sep. 28, 2012 for PCT Application No. PCT/US2012/020229, 9 pages.

Office Action dated Aug. 2, 2013 for U.S. Appl. No. 13/734,834, 47 pages.

International Preliminary Report on Patentability dated Jul. 17, 2014 for International Application No. PCT/US2012/020231, 7 pages.

Office Action dated Oct. 28, 2014 for Taiwan Patent Application No. 102100117, 7 pages.

Extended European Search Report dated Jul. 28, 2015 for European Application No. 12864336.8, 5 pages.

* cited by examiner

INCREASING VIRTUAL-MEMORY EFFICIENCIES

CROSS REFERENCE TO RELATED APPLICATIONS

The present application is a divisional of and claims priority under 35 U.S.C. § 120 to U.S. patent application Ser. No. 14/709,369, entitled "INCREASING VIRTUAL-MEMORY EFFICIENCIES", filed May 11, 2015 which is a continuation of and claims priority under 35 U.S.C. § 120 to U.S. patent application Ser. No. 13/734,834, entitled "INCREASING VIRTUAL-MEMORY EFFICIENCIES", filed Jan. 4, 2013, now U.S. Pat. No. 9,141,559, issued Sep. 22, 2015 which claims priority under 35 U.S.C. §§ 119 and 365(a) to International Application No. PCT/US2012/020231, filed Jan. 4, 2012, and entitled "INCREASING VIRTUAL-MEMORY EFFICIENCIES", which designated the United States of America and at least one country other than the United States. Accordingly, the present application also claims priority to International Application No. PCT/US2012/020231, filed Jan. 4, 2012, and entitled "INCREASING VIRTUAL-MEMORY EFFICIENCIES". The entire contents of International Application No. PCT/US2012/020231 and U.S. patent application Ser. Nos. 13/734,834 and 14/709,369 are hereby incorporated by reference in their entireties.

TECHNICAL FIELD

This application relates to the technical field of data processing, and more specifically to use of increasing efficiencies in computing systems utilizing virtual memory.

BACKGROUND

Many computer systems utilize virtual memory for security, stability and/or other purposes. In various virtual memory systems, a virtual machine monitor ("VMM") may control direct use of memory and/or computer processors in a computer system. The virtual machine monitor, which may be implemented in software and/or hardware, may allow guest software to run only in guest virtual machines, each containing their own guest address space defined by virtual memory addresses.

Thus, in many systems, a guest virtual machine may perform memory accesses using what appears, to the guest virtual machine, to be physical memory. These guest physical memory addresses may be mapped, in turn, to actual physical memory addresses through the use of page tables controlled by the virtual machine monitor. In some systems, these page tables may specify access permissions for memory pages (hereinafter, may simply referred to as "page"). Thus, a page table may define, for each page of virtual memory presented to a piece of guest software, whether the guest software may 1) execute instructions from that locations in that page, 2) read from locations in that page, and/or 3) write to locations in that page. In various systems, multiple page tables may be used, or switched to during execution, in order to allow particular accesses, as determined by the VMM. In various systems, additional page tables may be defined at the level of a guest virtual machine, where the page table may translate the guest virtual machines's virtual memory addresses to guest physical addresses. This may be separate, in some systems, from page tables used at the virtual machine monitor level, where the page tables may translate guest physical memory addresses to real physical memory addresses.

As an example, pages W and X may hold trusted data, while pages Y and Z may hold trusted code sections. To enable code in pages Y and Z to access data in pages W and X, but prevent code in other pages from accessing data in pages W and X, a page table may provide execute permission for pages Y and Z, and read/write permission for pages W and X.

However, in some scenarios, current page table utilization may introduce problems. In one scenario, an instruction may be large enough to fall in memory locations that straddle two different pages. If a page table does not allow execution of instructions for one of the pages, processor that seeks to execute the instruction may find itself unable to proceed, despite the fact that the instruction is at least partially found in memory for which execution is allowed.

In another scenario, modification of page tables may provide for inefficiencies. For example, during execution, the VMM may determine that a processor, or a hardware thread executing on a processor, may be desired to execute instructions in accordance with different permissions. In some such scenarios, page table used by the processor may be modified, or the processor may be pointed to a different page table in order to utilize the different permissions. However, in a situation where only a single hardware thread requires different permissions, modification or switching of the page table for the processor can cause every other thread operating on the processor to utilize the new page table as well. This can cause inefficiencies, as the other hardware threads may not be appropriate to operate under the different permissions, and/or the other hardware threads may find themselves paused or otherwise waiting while the page table is modified.

In yet another scenario, support may not exist in a VMM or in hardware for a VMM-level page table that keeps track of physical-page-level permissions. For example, in some existing systems, permissions are only kept at a guest VM level, and may be controlled at that level by the VMM. This may cause inefficiencies, however, because the VMM may not have a facility for keeping track of permissions on a per-physical-page level, and for manipulating permissions at this level. This may prevent the VMM from exercising the same degree of control and protection as may be desired.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Methods, apparatuses, and storage media associated with facilitating execution of instructions which are located in separate memory pages are disclosed herein. Methods, apparatuses, and storage media associated with executing instructions on different processing cores of a computer processor in accordance with different virtual memory page tables are also described herein. Additionally, methods, apparatuses, and storage media associated with modifying mirrored virtual memory page tables based on a permission received for a physical page table are described herein.

In various embodiments, one or more computer-readable storage media may include first instructions that, in response to execution by a computing device, may cause the computing device to determine that a second instruction that a computer processor of the computing device is about to execute is partially located in each of a first memory page and a second memory page, and that the computer processor does not have permission to execute instructions located in the first memory page. The instructions may also cause the computing device to facilitate execution of the second instruction in accordance with temporary permissions that permit execution of instructions located in both the first and the second memory pages.

In various embodiments, permission for execution of instructions located in the first memory page may be included in a first virtual memory page table, and the second instruction may be a member of a first group of instructions. Additionally, the first instructions, in response to execution by the computing device, may further cause the computing device to cause a first core of the computing processor to execute the first group of instructions in accordance with permissions from the first virtual memory page table. The first instructions may also cause a second core of the computing processor to execute another group of instructions in accordance with permissions from a second virtual memory page table contemporaneously with execution of the first group of instructions by the first core.

In various embodiments, the second instruction may be executed under control of a guest virtual machine comprising one or more guest virtual memory page tables defining permissions for guest virtual memory pages in the guest virtual machine. Additionally, the first instructions, in response to execution by the computing device, may further cause the computing device to determine that a page of a physical memory is to be associated with one or more memory access permissions and to modify one or more mirrored virtual memory page tables that mirror permissions from one or more guest virtual memory page tables for the guest virtual machines based at least in part on the request.

In various embodiments, one or more computer-readable storage media may include instructions that, in response to execution by a computing device, cause the computing device to cause a first core of a computing processor of the computing device to execute one or more first instructions in accordance with permissions from a first virtual memory page table. The instructions may also cause the computing device to cause a second core of the computing processor to execute one or more second instructions in accordance with permissions from a second virtual memory page table contemporaneously with execution of the one or more first instructions by the first core.

In various embodiments, one or more computer-readable storage media may include instructions that, in response to execution by a computing device, cause the computing device to determine that a page of a physical memory is to be associated with one or more memory access permissions and to modify one or more mirrored virtual memory page tables that mirror one or more guest virtual memory page tables for one or more guest virtual machines based at least in part on the request.

In other embodiments, apparatuses and/or computer-implemented methods may perform one or more of the operations discussed above and described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
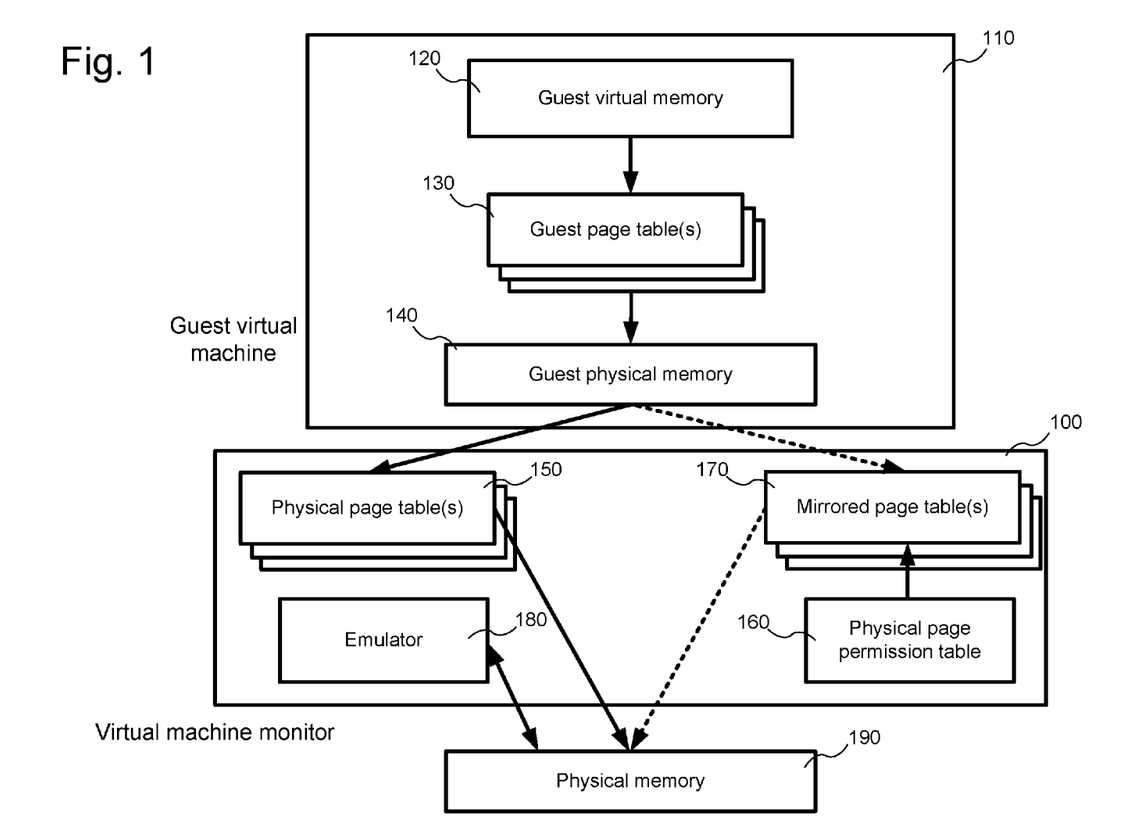
FIG. 1 is a block diagram illustrating a virtual machine monitor and guest software virtual machine using page tables, in accordance with various embodiments.

Referring to FIG. 1, a block diagram is shown illustrating a virtual machine monitor 100 which may, in various embodiments, facilitate usage of one or more physical virtual memory page tables 150 ("PPTs") to define permissions for memory accesses to physical memory 190 by a guest virtual machine 110 ("guest VM"). In various embodiments, one or more of the PPTs 150 may be used by each of one or more computer processors in a computing device executing the VMM 100; these computer processors may be associated with PPTs 150 through a "context" which points a processor (or processing core, as described below) to a particular PPT 150. In various embodiments, the virtual machine monitor 100 and guest software virtual machine 110 may be operated on a computing device, such as, but not limited to, a laptop, desktop, server, and/or mobile device.

In various embodiments, the guest software virtual machine 110 may include guest physical memory 140. In some embodiments, the guest physical memory 140 may, from the perspective of the guest VM 110, appear to be physical memory. However, in various embodiments, the guest physical memory 140 may include an abstraction of actual physical memory (such as, for example, physical memory 190), that is translated to the physical memory 190 using the virtual machine monitor 100, along with its PPTs 150. In various embodiments, the guest software virtual machine 110 may also comprise guest virtual memory 120, with guest virtual memory addresses being translated into addresses in guest physical memory 140 by one or more guest virtual memory page tables 130 ("GPTs"). In various embodiments, PPTs 150 may be used by the virtual machine monitor regardless of usage or implementation of GPTs 130.

Thus, as software executes in the guest VM 110, the guest software may attempt to access a memory location corresponding to a virtual address in the guest virtual memory 120. The guest virtual memory 120 may then refer to one or more GPTs 130 to translate the guest virtual memory address to a corresponding guest memory address in guest physical memory 140. The address in guest physical memory 140 may, in turn, be translated through one or more PPTs 150 to a corresponding physical memory address in the physical memory 190. In various embodiments, results of the access may be returned after such an access, such as, for example, read results or write acknowledgments. In other embodiments, access error messages may be returned, such as when a memory access is not permitted. These error messages are not illustrated for the purposes of simplified illustration. In various embodiments, that virtual machine monitor providing the PPTs 150 may be implemented, in whole or in part in hardware. In general, unless otherwise specified, discussions of "virtual memory" described below are made with reference to virtualized physical memory which is mapped from the guest memory 140 to actual physical memory 190 using the PPTs 150 of the VMM 100.

In various embodiments, the PPTs 150 may be configured to be used and or modified to facilitate execution of an instruction in software running on the guest VM 110 that straddles a page boundary. In various embodiments, the term "straddling" or "straddle" may refer to an instruction which is located in part in two different memory pages at the same time. In various embodiments, the PPTs may comprise one or more temporary or substitute PPTs for use in such facilitation of execution of straddling instructions. In various embodiments, one or more of the PPTs 150 may also be used on a per-processor-core basis, in order to help define different sets of permissions for different processor cores of a computer processor.

In various embodiments, the VMM 100 may also include one or more mirrored virtual memory page tables 170 ("MPTs"). In various embodiments, the MPTs 170 may be used allow the VMM 100, or software controlling the VMM 100, to control memory permissions found in the GPTs 130.

In various embodiments, the MPTs 170 may be configured to mirror page permissions of the GPTs 130 such that they effectively serve as proxies for VMM 100 control of the guest VM 110. In various embodiments, the guest physical memory 140 may translated to the physical memory 190 through the MPTs 170, as indicated by the dotted arrows connecting the guest physical memory 140, MPTs 170, and physical memory 190 in FIG. 1.

In various embodiments, the VMM 100 may also include a physical page permission table 160. In various embodiments, the physical page permission table 160 may be configured to include permission information about one or more physical memory pages. In various embodiments, and as described below, the physical page permission table 160 may be configured to set one or more permissions in the MPTs 170, and, by doing so, modify permissions that are mirrored in the MPTs 170 from the GPTs 130. In some embodiments, the MPTs 170 and physical page permission table 160 may be used in a VMM 100 that does not utilize or contain PPTs 150. In such embodiments, the VMM 100 may utilize the MPTs 170 in order to provide a facility for setting memory access permissions on a per-physical-page basis without requiring the use of PPTs 150.

In various embodiments, the VMM 100 may also include an emulator 180 which may be configured to execute instructions guest instructions from within the VMM 100. In various embodiments, the emulator 180 may be configured such that it has full permission to execute, read from, or write to any physical memory location. In various embodiments, the emulator 180 may be included in the VMM 100 regardless of whether PPTs 150 or MPTs 170 are used by the VMM 100.

Figure 2:
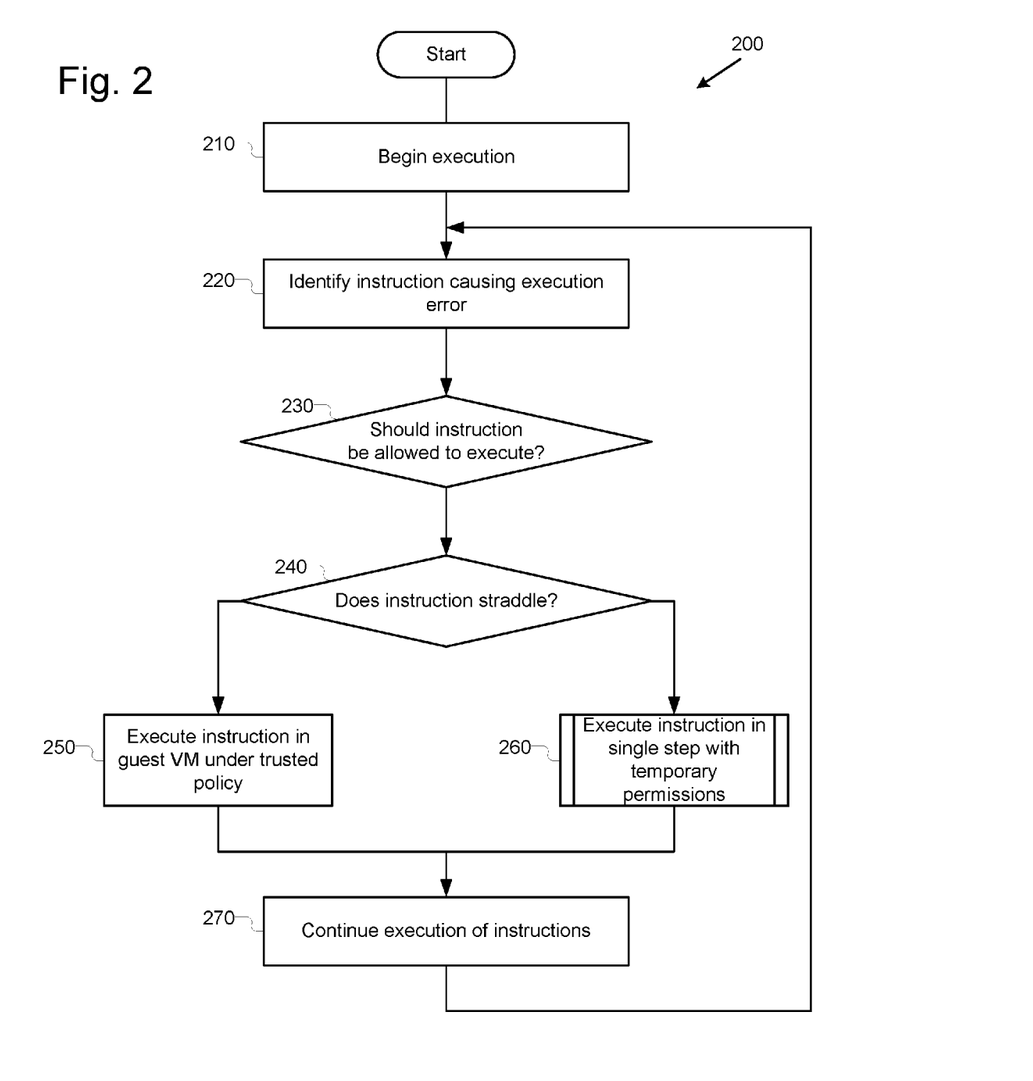
FIG. 2 illustrates an example process for executing an instruction that straddles two memory pages, in accordance with various embodiments.

FIG. 2 illustrates an example process 200 for executing an instruction that straddles two memory pages, in accordance with various embodiments. In various embodiments, process 200 may be performed by the VMM 100 and/or guest VM 110. Process 200 may begin at operation 210. At operation 210, the guest VM 110 may begin execution of software resident in the guest VM 110. This execution may include the guest VM 110 operating under control of the VMM 100 and utilizing one or more PPTs 150. At operation 220, the VMM may identify that an instruction to be executed by the guest VM 110 causes an execution error. For example, one such error may be that the identified instruction is located, in whole or in part, in a memory page for which no execute permissions are given by a currently-used PPT out of the PPTs 150. In other embodiments, other conditions may cause execution errors at operation 220.

Next, at decision operation 230, the VMM 100 may determine whether the identified instructions should be allowed to execute. In various embodiments, techniques of determining if the instruction should be allowed to execute may be known by one of ordinary skill in the art. If the VMM 100 determines that the instruction should not be allowed to execute, then an error may be returned and the process may end (not illustrated).

If, instead, the VMM 100 determines that the instruction should be allowed to execute, then at decision operation 240, the VMM may determine whether the instruction straddles two physical memory pages, such as from physical memory 190. If the VMM 100 determines that the instruction does not straddle two physical memory pages, then at operation 250, the VMM may cause the instruction to be executed in the guest VM 110 under a trusted policy; this execution may be performed according to techniques that may be known by one of ordinary skill in the art.

If, however, at operation 240, the VMM determines that the instruction straddles two memory pages, then at operation 260, the VMM may cause the instruction to execute in a single step under temporary permissions. In various embodiments, operation 260 may be implemented in various ways. Particular examples of implementations of operation 260 may be found below at FIGS. 3, 4, and 5.

After conclusion of operation 250 or 260, at operation 270, the guest VM 110 may continue execution of the software. The process may then proceed back to operation 220 if another instruction is identified which is not permitted by a currently-used PPT 150. After the guest VM 110 has completed execution of the guest VM 110 software, process 200 may end (not illustrated).

Figure 3:
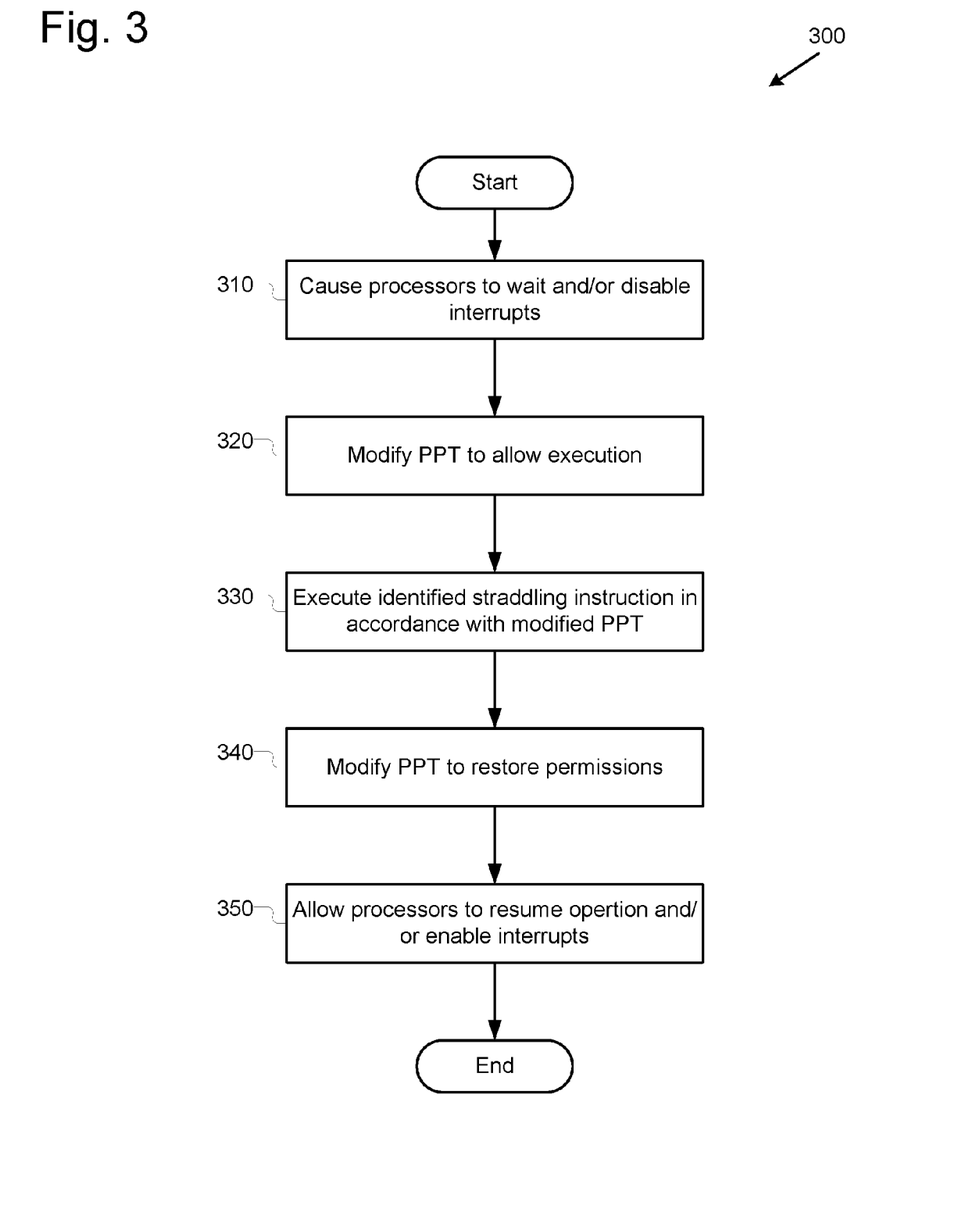
FIG. 3 illustrates an example process for executing a straddling instruction using a modified page table, in accordance with various embodiments.

FIG. 3 illustrates an example process 300 for executing a straddling instruction using a modified page table, in accordance with various embodiments. In various embodiments, process 300 may be performed as an implementation of operation 260 of process 200. In various embodiments, process 300 may be performed in order to allow the identified straddling instruction to be executed in accordance with a modified PPT that allows execution for each of the physical pages which the identified instruction straddles. In various embodiments, process 300 may be performed by the VMM 100 and guest VM 110. In various embodiments, process 300 may be performed using a PPT 150 that is being used by the computer processor or processor core which the identified straddling instruction may be executed on. For the purposes of discussion, this PPT 150 will be referred to herein at the "current PPT 150."

Process 300 may begin at operation 310. At operation 310, the VMM 100 may cause one or more processors to pause or otherwise wait on execution, and may disable interrupts. This pausing/disabling may be performed to allow for modification to be performed to the current PPT 150. In various embodiments, the processors that are made to wait may be only those processors that are currently utilizing the current PPT 150.

Next, at operation 320, the VMM may modify the current PPT 150 to allow execution of the identified straddling instruction. For example, if the instruction straddles physical pages A and B, and execution is only permitted on page B by the current PPT 150, then at operation 320 the current PPT 150 may be modified to allow execution of instructions located in page A as well.

Next, at operation 330, the guest VM may be allowed by the VMM to execute the single identified straddling instruction. In various embodiments, the instruction may be executed under a flag or other hardware- or software-enabled construct that allows only the single instruction itself to be executed before control is returned to the VMM. This helps confirm that only the instruction at hand is executed in accordance with the modified current PPT 150, and that the current PPT may be returned to its former state for execution of subsequent instructions executed by the guest VM 110.

After the identified straddling instruction is executed at operation 330, at operation 340, the VMM 100 may modify the current PPT 150 to restore the previous restrictive permissions. Then, at operation 350, the VMM 100 may allow the processors which were made to wait to resume operation and may enable interrupts. Process 300 may then end.

Figure 4:
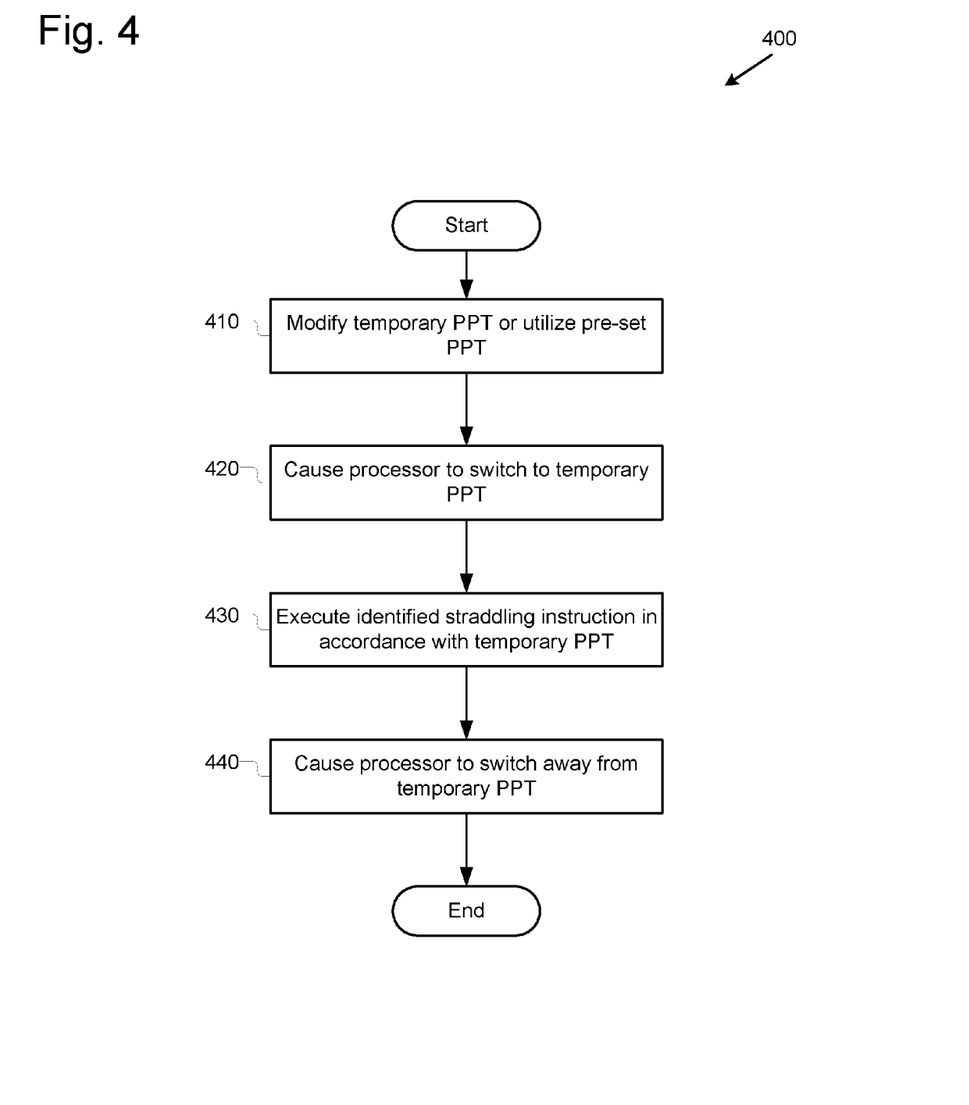
FIG. 4 illustrates an example process for executing a straddling instruction using a temporary page table, in accordance with various embodiments.

FIG. 4 illustrates an example process 400 for executing a straddling instruction using a temporary page table, in accordance with various embodiments. In various embodiments, process 400 may be performed as an implementation of operation 260 of process 200. In various embodiments, process 400 may be performed by the VMM 100 and guest VM 110.

In various embodiments, process 400 may be performed in order to allow the identified straddling instruction to be executed in accordance with a temporary PPT out of the PPTs 150 that allows execution for each of the physical pages which the identified instruction straddles. In various embodiments, a temporary PPT 150 may be used in order that the current PPT 150 may not have to be modified. In various embodiments, additional efficiencies may be realized by avoiding modification of the current PPT 150, as processors may not have to be paused, in contrast to process 300.

Process 400 may begin at operation 410. At operation 410, the VMM 100 may modify a temporary PPT 150 to allow execution of the identified straddling instruction. For example, in one embodiment, similar to the modification discussed above with respect to operation 320, a temporary PPT 150 may be modified in order to provide execution permission for both physical pages that the identified straddling instruction straddles. In other embodiments, the temporary PPT 150 may not be modified. Instead, a temporary PPT 150 may be used that is pre-set with increased execution permissions. For example, a pre-set temporary PPT 150 may include execute permissions for the entire address space used by the guest VM 110. In other embodiments, the temporary PPT 150 may contain execute permissions for less than the entire address space, but more than merely the two pages which are straddled by the identified instruction. In such embodiments, the temporary PPT 150 may not need to be modified, since it already includes sufficient permissions to facilitate execution of the identified straddling instruction.

Next, at operation 420, the VMM may cause the processor that seeks to execute the identified straddling instruction to switch to using the temporary PPT 150. Then, at operation 430, the guest VM may be allowed by the VMM to execute the single identified straddling instruction. In various embodiments, the instruction may be executed under a flag or other hardware- or software-enabled construct that allows only the single instruction itself to be executed before control is returned to the VMM. This helps confirm that only the instruction at hand is executed in accordance with the temporary PPT 150, and that subsequent instructions executed by the guest VM 110 may be executed in accordance with the current PPT 150 or with PPTs other than the temporary PPT 150. After the instruction is executed, at operation 440, the VMM may cause the processor executed the identified straddling instruction to switch to another PPT 150 other than the temporary PPT 150. The process may then end.

Figure 5:
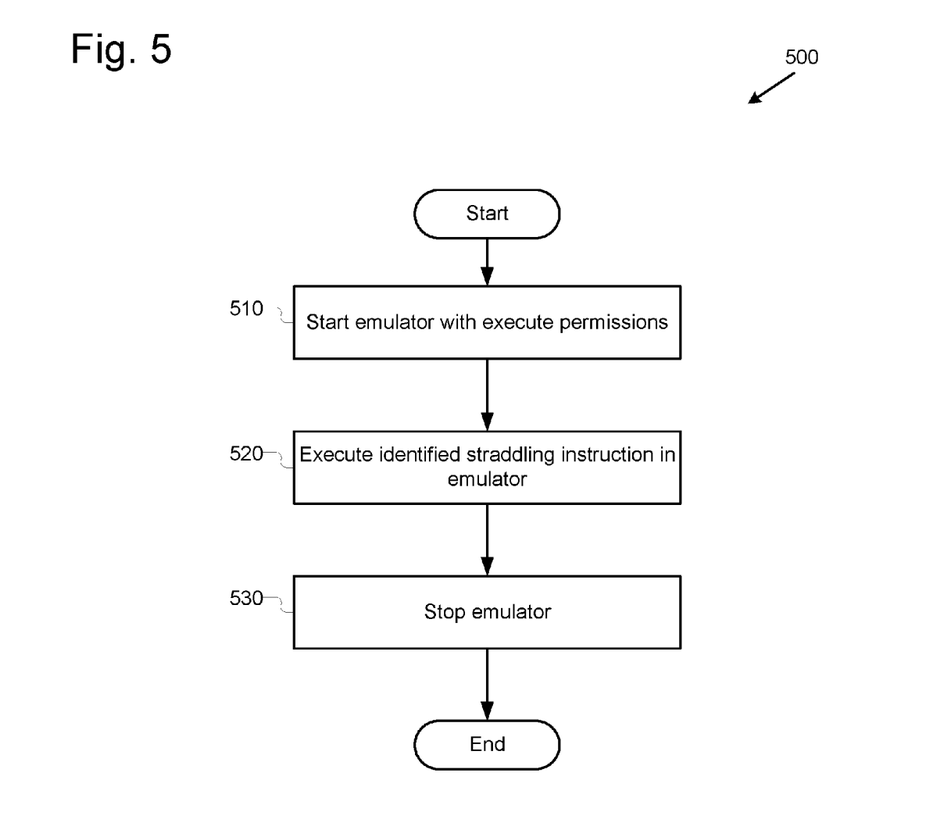
FIG. 5 illustrates an example process for executing a straddling instruction using emulation, in accordance with various embodiments.

FIG. 5 illustrates an example process 500 for executing a straddling instruction using emulation, in accordance with various embodiments. In various embodiments, process 500 may be performed as an implementation of operation 260 of process 200. In various embodiments, process 500 may be performed by the VMM 100 and guest VM 110.

In various embodiments, process 500 may be performed in order to allow the identified straddling instruction to be executed by an emulator 180 of the VMM 100. In various embodiments, process 500 may utilize an emulator 180 of the VMM 100 that is configured to be able to execute operations with full memory access permissions (also known as "root access"). Such an emulator, because it is not constrained by permissions, may execute any operation given to it by the VMM. This means, the VMM may execute the identified straddling instruction using the emulator without further modification or switching of PPTs 150, as done in processes 300 and 400.

Process 500 may begin at operation 510. At operation 510 the VMM 100 may start up the emulator 180, giving it full memory access privileges. In some embodiments, the emulator 180 may be given less than full memory access privileges; for example the emulator 180 may have only full execute privileges for all memory locations. However, in such embodiments, the emulator 180 may find itself unable to execute the identified straddling instruction; thus in some embodiments, the emulator 180 may have full privileges. Next, at operation 520, the instruction may be executed in the emulator 180 inside VMM 100. Next, at operation 530, the emulator 180 may be stopped by VMM 100. The process may then end.

Figure 6:
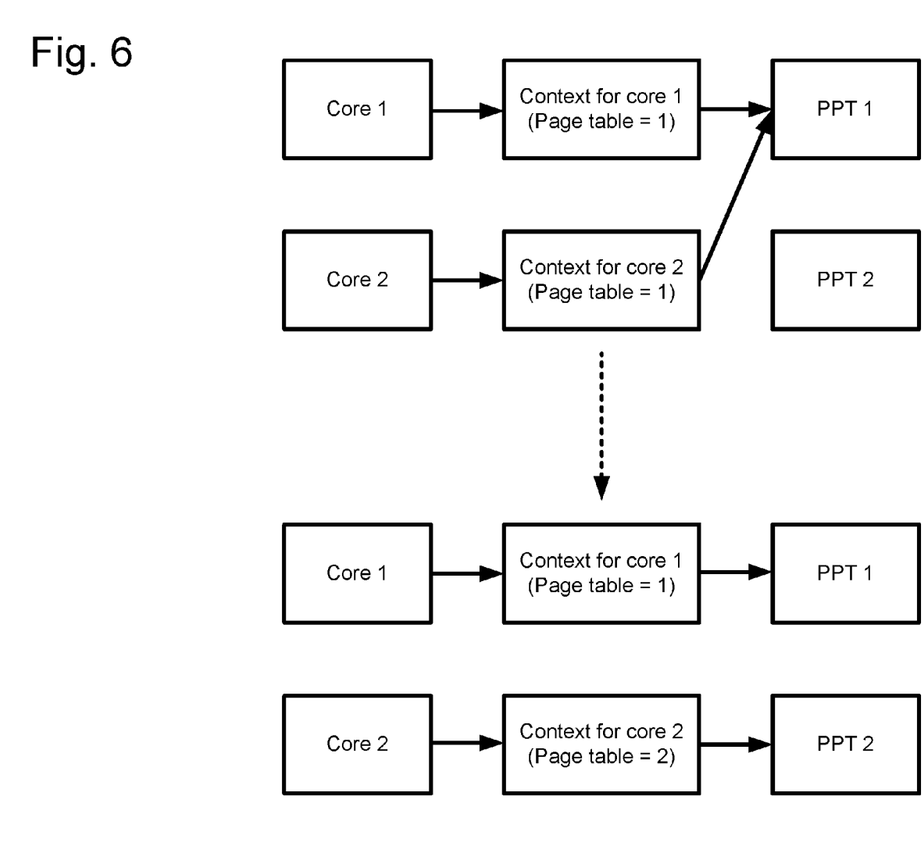
FIG. 6 is a block diagram illustrating an example usage of per-core physical page tables, in accordance with various embodiments.

FIG. 6 is a block diagram illustrating an example usage of per-core PPTs 150, in accordance with various embodiments. In various embodiments, it may be desirable to control memory access permissions at a per-core level, rather than at a per-processor level, for example by executing instructions on one core in accordance with a PPT 150 that is different than PPTs 150 used by other cores on the same processor. For example, a hardware thread running on a core of a processor may include an instruction that is not allowed by a current PPT 150 for the processor. If the VMM 100 determines that the instruction should be allowed, it may change the relevant PPT 150 accordingly. However, this may provide increased permissions for other hardware threads running on other processor cores on the processor. This is undesirable and may weaken security. Additionally, since modification of a PPT 150 takes time, any time a PPT 150 is modified all cores that utilize the PPT 150 may be forced to wait on the modification, reducing efficiency.

FIG. 6 shows an example usage of per-core PPTs 150; in particular FIG. 6 shows modification of a context associated with a processor core in order to cause that processor core to execute instructions in accordance with a different PPT 150 than another processor core. The example shows an initial configuration at the top of the Figure that is changed to a different configuration at the bottom.

In the example, cores 1 and 2 may be processing cores of a computer processor. In FIG. 6, each of cores 1 and 2 is associated with a context, that tells the processor core which PPT 150 the processor core is executing in accordance with. Thus, in the initial configuration, at the top of FIG. 6, the contexts of each of cores 1 and 2 cause the cores to execute instructions in accordance with the same PPT 150, namely the PPT referred to in FIG. 6 as PPT 1.

In the configuration at the bottom of FIG. 6, the context associated with core 2 has been changed. Thus, in the changed configuration, core 2's context tells core 2 to execute instructions in accordance with the PPT 150 referred to in FIG. 6 as PPT2. As FIG. 6 shows, in the example changed configuration, each of cores 1 and 2 are executing instructions in accordance with different PPTs 150. In various embodiments, one of these different PPTs 150 may be modified, or switched to a third PPT 150 without affecting the operation of processor cores utilizing the other PPT 150.

Figure 7:
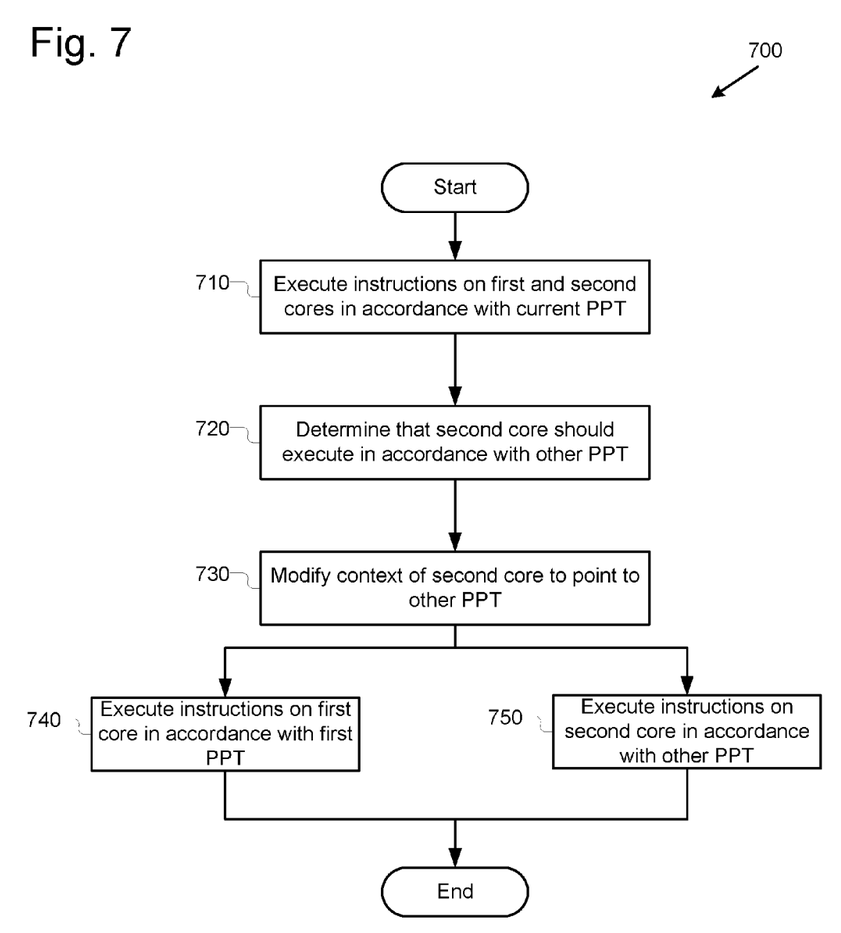
FIG. 7 illustrates an example process for executing instructions in accordance with per-core page tables, in accordance with various embodiments.

FIG. 7 illustrates an example process 700 for executing instructions in accordance with per-core page tables, in accordance with various embodiments. In various embodiments, process 700 may be performed by the VMM 100 and one or more guest VMs 110. The process may begin at operation 710, where, in various embodiments, the guest VMs are executing instructions using first and second processing cores in accordance with a first PPT 150. Next, at operation 720, the VMM 100 may determine (without loss of generality) that the second core should execute in accordance with an other PPT 150. In various embodiments, the VMM 100 may determine by determining that the second processing core should operate under different permissions that may be directed by the other PPT 150. In other embodiments, the VMM 100 may receive a request to change permissions for the processor core, such as from anti-malware software or other software or hardware. In various embodiments, the VMM 100 may determine that the processor core should execute in accordance with the other PPT 150 based at least in part on a hardware thread executing on the second core.

Next, at operation 730, the VMM 100 may modify the context of the second core such that the second core is pointed to execute instructions in accordance with the other PPT 150. Then, at operations 740 and 750, which may be performed in parallel and/or otherwise concurrently, the one or more guest VMs execute instructions on the first core in accordance with the first PPT (e.g. at operation 740) and the one or more guest VMs execute instructions on the second core in accordance with the other PPT (e.g, at operation 750). The process may then end.

Figure 8:
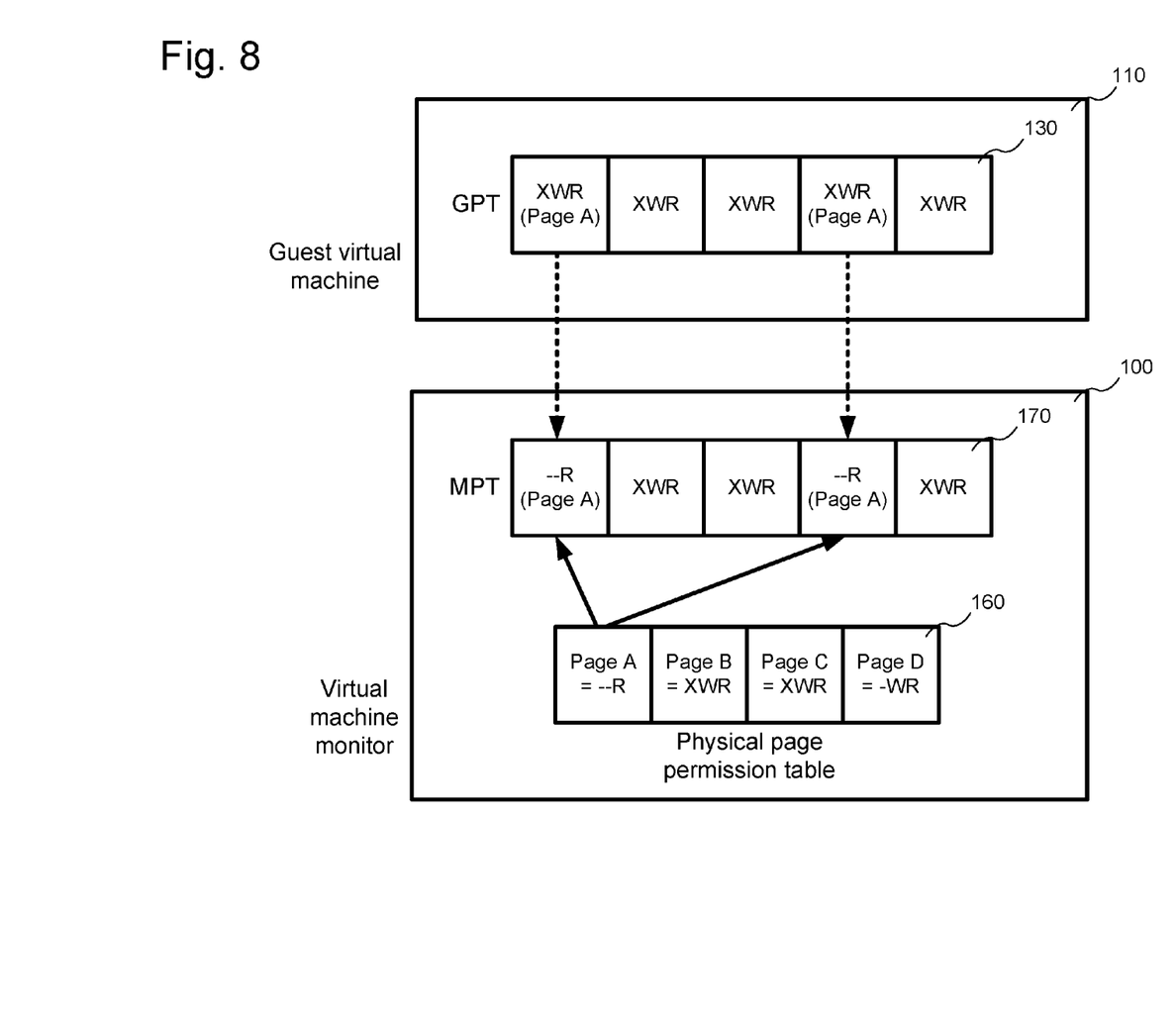
FIG. 8 is a block diagram illustrating an example usage of a physical page permission table to maintain per-physical-page permissions, in accordance with various embodiments.

FIG. 8 is a block diagram illustrating an example usage of a physical page permission table to maintain per-physical-page permissions, in accordance with various embodiments. As discussed above, in various embodiments, the VMM 100 may utilize a physical page permission table 160 in order to maintain and track memory access permissions on a per-physical-page basis. In particular, physical page permission tables 160 may be used when the VMM is not equipped with PPTs 150 in order to allow for a degree of tracking of physical page permissions. In such embodiments, typically permissions are kept at the level of the guest VMs, such as in one or more GPTs 130, as described above. In embodiments, the VMM 100 may be configured to facilitate the setting of GPTs 130 based on permissions kept in the physical page permission table 160. In various embodiments, the physical page permission table 160 may comprise one or more data structures, including, but not limited to, a hash table.

As the example of FIG. 8 illustrates, in various embodiments, the physical page permission table 160 may comprise one or more entries that record permissions for one or more pages of physical memory, such as physical memory 190. For example, the physical page permission table 160 of FIG. 8 shows that page A has only read permissions, page D has read and write permissions, and pages B and C allow full permissions. In various embodiments, the physical page permissions that are recorded in the physical page permission table 160 may be set by the VMM 100 and/or by software or hardware that the VMM allows to control the VMM 100, such as anti-malware software.

The VMM may additionally comprise MPTs, such as, for example, the illustrated MPT 170. As described above, in various embodiments, the MPT 170 may include one or more permissions for pages in the guest VM 110, and may be mirrored from the GPT 130 in the guest VM in order that the VMM 100 may view and utilize the permissions kept in the GPT 130. In various embodiments, the VMM 100 may be configured to modify the mirrored permissions stored in the MPTs 170 based on the permissions recorded in the physical page permission table 160.

In various embodiments, however, because the entries in the MPTs 170 may reflect pages in the guest VM 110, multiple entries in the MPTs 170 may map to the same physical page in the physical memory 190. Thus, in various embodiments, a modification to one entry in the physical page permission table 160 may result in a modification to more than one entry in an MPT 170 (or, alternatively, no entry in the MPT 170 no guest virtual memory pages map to the physical memory page). In the example of FIG. 8, this non one-to-one mapping can be seen where the read-only permission for physical page A has affected two different entries in the MPT 170. Additionally, it may be noted that, because the MPT 170 has been modified based on the entry in the physical page permission table 160, the two entries in the MPT 170 that map to page A no long exactly mirror the permissions in their corresponding entries in GPT 130. As such, the VMM is configured to set per-physical-page permissions regardless of the permissions set by the GPT 130.

Figure 9:
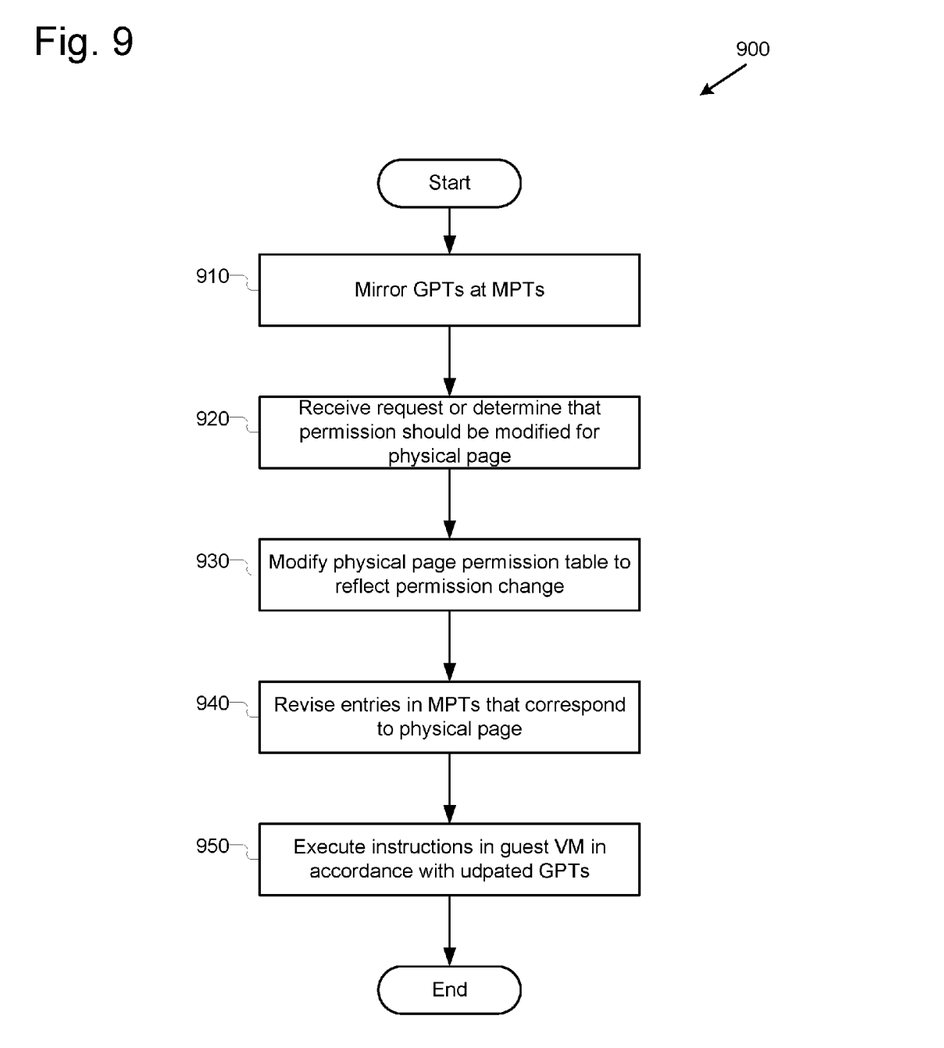
FIG. 9 illustrates an example process for maintaining permissions in accordance with a physical page permission table, in accordance with various embodiments.

FIG. 9 illustrates an example process 900 for maintaining permissions in accordance with a physical page permission table, in accordance with various embodiments. In various embodiments, the operations of process 900 may be performed by the VMM 100 and/or the guest VM 110. Process 900 may begin at operation 910. At operation 910, the VMM 100 may, in various embodiments, mirror permissions stored in GPTs 130 in the MPTs 170. Next, at operation 920, in various embodiments the VMM 100 may receive a request to modify a permission for a physical page. In other embodiments, the VMM 100 may receive a request to modify the permission for the physical page, such as from anti-malware software.

Next, at operation 930, in various embodiments, the VMM 100 may modify the physical page permission table 160 to reflect the permission modification received or determined at operation 920. Next, at operation 940, in various embodiments, the VMM 100 may revise entries in the MPTs 170 that correspond to the physical page for which permissions were modified. In some embodiments, this revision may result in the MPTs 170 containing permissions that are no longer identical to their corresponding GPTs 130 (since the GPTs 130 may not necessarily know about the per-physical-page permissions set by the VMM). At operation 950, the guest VM 110 may then execute one or more instructions in accordance with the updated MPTs 170. The process may then end.

Figure 10:
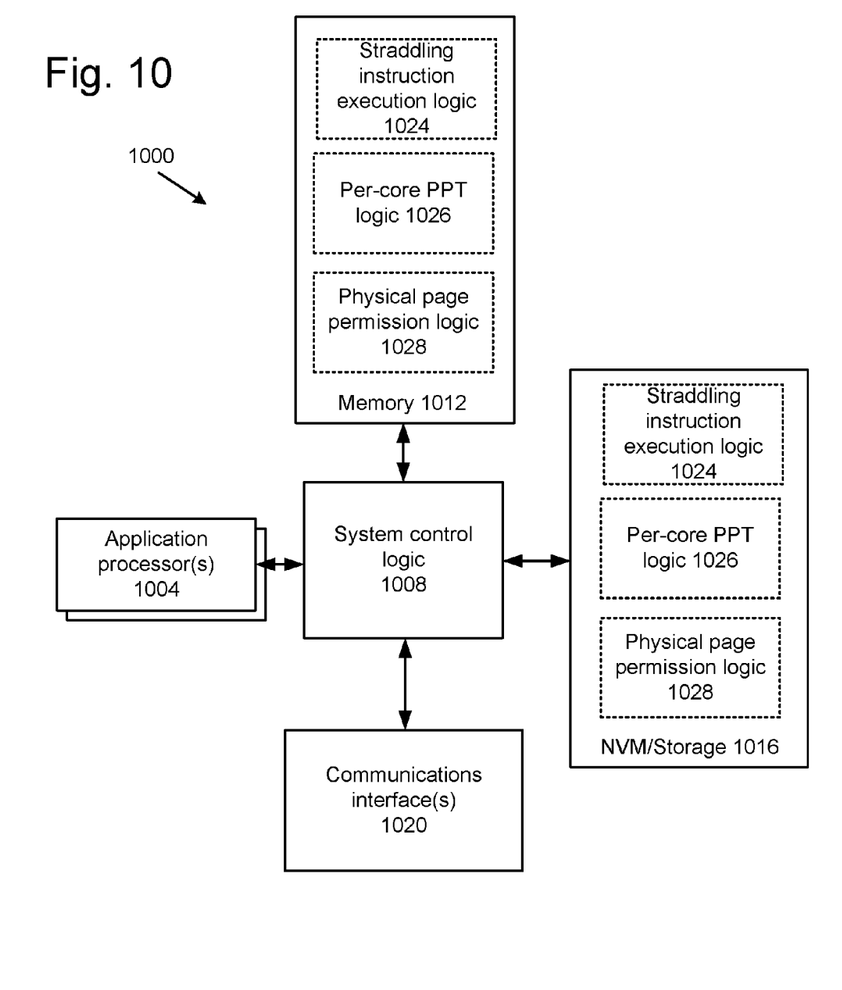
FIG. 10 illustrates an example computing environment, in accordance with various embodiments.

The techniques and apparatuses described herein may be implemented into a system using suitable hardware, firmware, and/or software to configure as desired. FIG. 10 illustrates, for one embodiment, an example system 1000 including at least processors 1004, each having one or more processor cores, system control logic 1008 coupled to at least one of the processors 1004, memory 1012 coupled to system control logic 1008, non-volatile memory ("NVM")/storage 1016 coupled to system control logic 1008, and one or more communications interface(s) 1020 coupled to system control logic 1008. In various embodiments, the system 1000 may include components of a CPU-based software system, a management engine system, or a combination of the two.

System control logic 1008 for one embodiment may include any suitable interface controllers to provide for any suitable interface to at least one of the processors 1004 and/or to any suitable device or component in communication with system control logic 1008. The processors may include a dedicated application processor upon which an application environment may be operated, as well as a separate service processor upon which a manageability engine may be operated. The system may include additional processors or processing cores (not illustrated).

System control logic 1008 for one embodiment may include one or more memory controller(s) to provide an interface to memory 1012. System memory 1012 may be used to load and store data and/or instructions, for example, for system 1000. System memory 1012 for one embodiment may include any suitable non-transitory computer-readable volatile memory, such as suitable dynamic random access memory (DRAM), for example.

System control logic 1008 for one embodiment may include one or more input/output (I/O) controller(s) to provide an interface to NVM/storage 1016 and communications interface(s) 1020.

NVM/storage 1016 may be used to store data and/or instructions, for example. NVM/storage 1016 may include any suitable non-transitory computer-readable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s), for example.

The NVM/storage 1016 may include a storage resource physically part of a device on which the system 1000 is installed or it may be accessible by, but not necessarily a part of, the device. For example, the NVM/storage 1016 may be accessed over a network via the communications interface(s) 1020.

Memory 1012 and NVM/storage 1016 may include, in particular, temporal and persistent copies of logic, respectively. In the illustrated example, this logic may include one or more of straddling instruction execution logic 1024, per-core PPT logic 1026, and/or physical page permission logic 1028. The straddling instruction execution logic 1024 may include instructions that, when executed by at least one of the processors 1004, may cause system 1000 to perform some or all of the operations associated with processes 200, 300, 400, and/or 500. The per-core PPT logic 1026 may include instructions that, when executed by at least one of the processors 1004, may cause system 1000 to perform some or all of the operations associated with process 700. The physical page permission logic 1028 may include instructions that, when executed by at least one of the processors 1004, may cause system 1000 to perform some or all of the operations associated with process 900. In some embodiments, all or part of the straddling instruction execution logic 1024, per-core PPT logic 1026, and/or physical page permission logic 1028 may additionally/alternatively be located in the system control logic 1008.

Communications interface(s) 1020 may provide an interface for system 1000 to communicate over one or more network(s) and/or with any other suitable device. Communications interface(s) 1020 may include any suitable hardware and/or firmware. Communications interface(s) 1020 for one embodiment may include, for example, a network adapter, a wireless network adapter, a telephone modem, and/or a wireless modem. For wireless communications, communications interface(s) 1020 for one embodiment may use one or more antenna(s).

For one embodiment, at least one of the processor(s) 1004 may be packaged together with logic 1024, 1026 and/or 1028. For one embodiment, at least one of the processor(s) 1004 may be packaged together with logic 1024, 1026 and/or 1028 to form a System in Package (SiP). For one embodiment, at least one of the processor(s) 1004 may be integrated on the same die with logic f1024, 1026 and/or 1028. For one embodiment, at least one of the processor(s) 1004 may be integrated on the same die with logic f1024, 1026 and/or 1028 to form a System on Chip (SoC). For at least one embodiment, the SoC may be utilized in a smart phone, a cell phone, a computing tablet, an internet appliance, a personal digital assistant, or others mobile device.

In various embodiments, system 1000 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. An apparatus comprising:
   one or more computer processors; and
   a virtual machine monitor to be operated by the one or more computer processors to:
      cause a first core and a second core of a computer processor of the one or more computer processors to execute one or more first instructions in accordance with permissions from a first virtual memory page table;
      determine the second core should operate with a different set of permissions; and
      cause the second core of the computer processor to execute one or more second instructions in accordance with permissions from a second virtual memory page table contemporaneously with execution of the one or more first instructions by the first core.

2. The apparatus of claim 1, wherein the virtual machine monitor is to determine the second core should operate with a different set of permissions based at least in part on a request to change permissions for the second core.

3. The apparatus of claim 2, wherein the request is from anti-malware software.

4. The apparatus of claim 1, wherein the virtual machine monitor is to modify a context of the second core such that the second core is caused to execute the one or more second instructions in accordance with permissions from the second virtual memory page table.

5. One or more non-transitory computer-readable storage media comprising instructions stored thereon that, in response to execution by a computing device, cause the computing device to:
   cause a first core and a second core of a computer processor to execute one or more first instructions in accordance with permissions from a first virtual memory page table;
   determine the second core should operate with a different set of permissions; and
   cause the second core of the computer processor to execute one or more second instructions in accordance with permissions from a second virtual memory page table.

6. The one or more non-transitory computer-readable storage media of claim 5, wherein the computing device is to cause the second core of the computer processor to execute the one or more second instructions in parallel with execution of the one or more first instructions by the first core of the computer processor.

7. The one or more non-transitory computer-readable storage media of claim 5, wherein the computing device is to determine the second core should operate with a different set of permissions based at least in part on a request.

8. The one or more non-transitory computer-readable storage media of claim 7, wherein the request is from anti-malware software.

9. The one or more non-transitory computer-readable storage media of claim 5, wherein the computing device is to modify a context of the second core such that the second core is caused to execute the one or more second instructions in accordance with permissions from the second virtual memory page table.

\* \* \* \* \*